Figure 4:
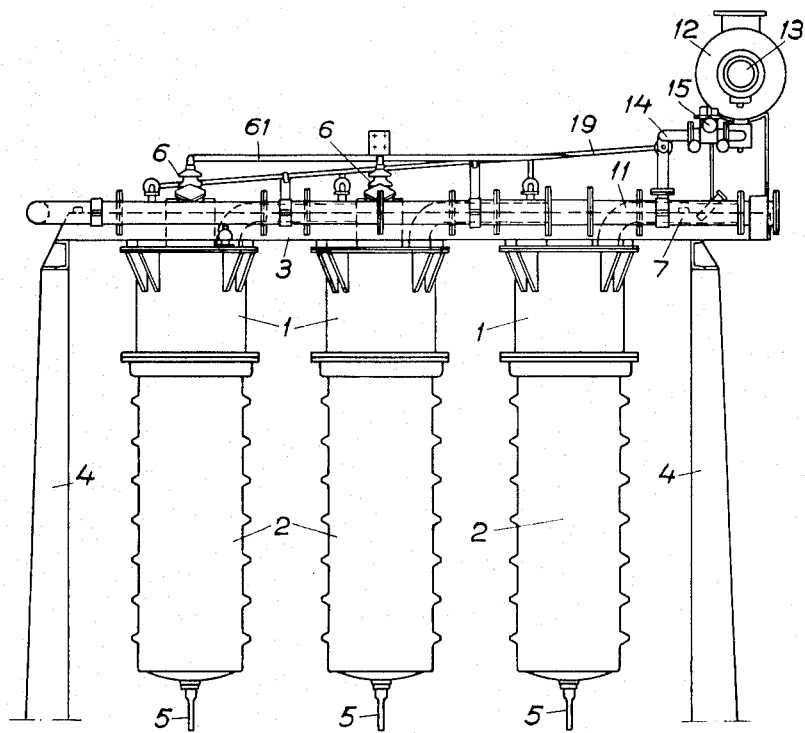

June 28, 1966            B. LOMAR            3,258,651
ARRANGEMENT OF OIL-COOLED APPARATUS FOR HIGH VOLTAGES
Filed Feb. 18, 1964            2 Sheets-Sheet 1
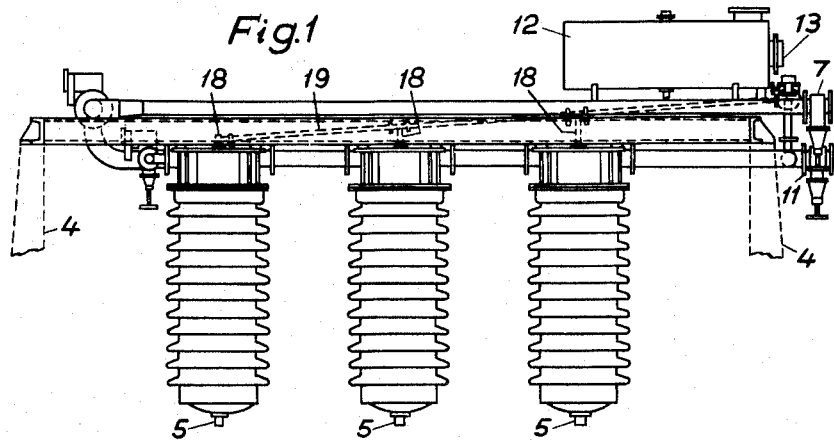
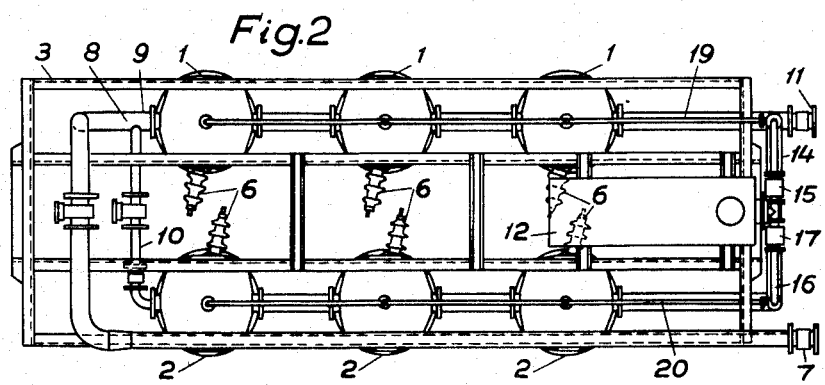
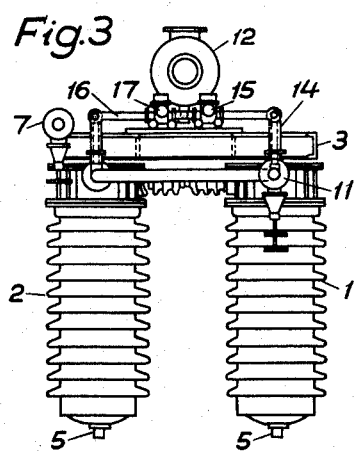
INVENTOR.
BERTIL LOMAR
BY Bailey, Stephens &
Huettig June 28, 1966     B. LOMAR     3,258,651
ARRANGEMENT OF OIL-COOLED APPARATUS FOR HIGH VOLTAGES
Filed Feb. 18, 1964     2 Sheets-Sheet 2

INVENTOR.
BERTIL LOMAR

United States Patent Office 3,258,651
Patented June 28, 1966

3,258,651
ARRANGEMENT OF OIL-COOLED APPARATUS
FOR HIGH VOLTAGES
Bertil Lomar, Ludvika, Sweden, assignor to Allmanna
Svenska Elektriska Aktiebolaget, Vasteras, Sweden, a
corporation of Sweden
Filed Feb. 18, 1964, Ser. No. 345,683
Claims priority, application Sweden, Feb. 23, 1963,
1,992/63
7 Claims. (Cl. 317—103)

In the erection of oil-cooled equipment intended for high voltages, such as resistances, reactance coils, lightning arresters, etc., which are connected to the high voltage at one of their ends, while the other is at or near earth potential and where these devices are enclosed in insulating tubes of porcelain or similar material, it is usual to position the device upright on a base with the earthed end downwards and the end which is connected to the high voltage upwards. If the devices are self-cooled individually, each device may be provided with auxiliary equipment such as expansion vessels, gas operated relay, oil level indicator, etc., arranged above the devices. These members will then be at the high voltage and any remote indicating of measuring values and signals must be carried out with the help of expensive insulating transformers. It is of course possible to arrange expansion vessels with oil level indicators and gas operated relays at earth potential, but they must then be erected at a safe distance from the high voltage device. The oil conduits from the device to the expansion vessel must also be dimensioned so that the insulation is sufficient.

If the devices are in a three-phase system, it is desirable to avoid the expense of cooling each unit by means of its own cooling system. Even if it was feasible to use a common cooler with parallel-connected branches to each unit, great difficulties would be involved in maintaining the same amount of oil for each device and an expensive tube system with built in throttle valves would be required in such a construction. This means in practice that the cooling system in the devices should be series connected. Because of unavoidable pressure drop in the conduits and above all in the cooling systems of the devices different oil pressures will prevail in the different devices and this means that each device must be equipped with its own expansion vessel, its own oil level indicator and gas operating relay, etc. It is then also necessary to have an insulator transformer for each phase to bring the measuring value and signals down to earth potential.

By means of the present invention the disadvantages connected with the above described arrangements of the devices are removed. The invention is characterised in that each device is attached with its earth-connected end upwards to an earthed pole bridge and with the end connected to the high voltage downwards and with the members, such as expansion vessels, temperature and oil level indicators, gas operating relays, etc., located on the highest parts of the devices, suitably erected on an earthed bridge.

On the accompanying drawing an embodiment of the invention is shown adapted to a three-phase high pass filter connected to the alternating current side in a transmission system for high voltage direct current. FIGURE 1 shows the filter from the side, FIGURE 2 from above, while FIGURE 3 shows the same from one end. FIGURE 4 shows a modification of the filter.

The filter shown in FIGURES 1, 2 and 3 of the drawing consists of three resistances 1 and three reactors 2 where the resistances are arranged in a line and the three reactors in a line parallel to this. The resistances and reactors which in the following are called devices are erected on the under side of a switchgear bridge 3, which is supported by poles 4 and preferably is earthed. The devices are provided at their lowest parts and device 5 for connecting to the high voltage. At the upper ends the devices are provided at their lowest parts with device 5 for con-earthing of the filter. The coolant, which is usually oil, is supplied to the filter from a pump and cooling plant, not shown, through a feed line 7. From a branching point 8 the coolant is led through a comparatively thick conduit 9 to the resistance 1, cooling system of which is series-connected and thus the same amount of cooling liquid flows through. A thinner branch 10 leads the cooling liquid from the branch point 8 through the reactors 2. After the cooling liquid has passed the devices it is led through a common drainage conduit 11 back to the pump and cooling plant.

Above the switchgear bridge an expansion vessel 12 common for the whole filter is erected. The expansion vessel is provided with an oil level indicator 13. The drainage conduit from the resistance 1 is connected by means of a conduit 14 to the expansion vessel 12. In this conduit a gas operating relay 15 for the resistance is connected.

In the same way the drainage conduit from the reactors is connected to the expansion vessel by means of a conduit 16 and a gas operating relay 17 connected therein.

Each resistance is provided at its highest part with a venting tube 18. All these tubes are connected by means of a common conduit 19 to the conduit 14 ahead of the gas operating relay 15. The reactors are also in the same way connected by means of a common venting conduit 20 to the tube 16 and the gas operating relay 17. The gas operating relay 15 indicates thus possible faults in the resistances while the gas operating relay 17 indicates faults in the reactors. Faulty signals and indications of pressure, temperature, level, etc., could in the easiest imaginable way be remotely indicated by the devices which are at earth potenial.

The filter described is in the first place intended to be used on lines with very high voltage, preferably of the magnitude of some hundreds of kv. In certain plants for transmitting electrical power with high voltage direct current it may be preferable to allow the direct current line to go all the way to the consumption place or at least to such a distance therefrom so that it is to be preferred to keep the voltage on the lines going out from the inverter station at a value of only some tens of kv. The necessary harmonics filters could be made simpler by arranging the reactor as well as the resistance within a common housing.

The filter shown in FIGURE 4 consists of three units, one for each phase. Each filter unit consists of a resistance part 1 and a reactor part 2. The filter units are erected on the under side of a switchgear bridge 3, which is supported by poles 4 and is earthed. The filter units are provided at their lowest parts with devices 5 for connection to the high voltage. The reactor part is enclosed in a housing of insulating material, suitably porcelain. The resistance part is enclosed in a cylindrically ring-shaped housing, which for high voltages is made of insulating material. For lower voltages, when the insulation level allows the housing may be made of plate. The housing has a ring-shaped flange at each end. The lower flange serves to connect the housing of the reactor part to that of the resistance part. By means of the upper flange the filter unit is attached to the switchgear bridge. The filter units are provided at their upper ends with inlets 6 for connecting and possible earthing of the filter by means of a bar 61. The coolant, which is usually oil, is supplied to the filter from a pump and cooling plant, not shown, through a feed line 7 and circulates through the three units, the cooling system of which are series-connected and thus the same amount of cooling liquid flows through each. After the cooling liquid has passed all the filter units it is led through a common drainage conduit 11 back to the pump and cooling plant. The drainage conduit is shown in the figure lying in the same plane as the feed line 7 and is therefore shown with dotted lines.

It is quite obvious that the invention involves great practical and economical advantages. By quite radically turning the filter upside down a construction is obtained where all feeding and control takes place at earth potential. The fact that expansion vessels and other auxiliary members are at earth potential implies also that during their construction consideration need not be taken of the risk of glowing at sharp edges and projecting parts, which is necessary if in the usual way they are at high potential. If the bridge is provided with suitable protection devices, such as for example network floors and protective railings, certain maintenance and service work may be carried out during operation.

The embodiment of the filter shown may be considered merely as an example of how the invention may be adapted in practice. Modifications are feasible both with regard to the build up of the filter units, their internal placing as well as the arrangement of the members common to the filters.

I claim:

1. Arrangement of a harmonic filter for high voltage direct current networks comprising high voltage oil-cooled electrical devices in electrical outdoor switchyards, said devices being connected to the high voltage at one of their ends and having their other end connected to ground, a grounded pole bridge, said devices having their grounded ends mounted upwards and connected to the under side of the bridge, said ends of said devices connected to the high voltage being directed downwards, housing depending from said bridge enclosing said devices, said devices having common auxiliary equipment located on said grounded bridge, said common auxiliary equipment including cooling means for said devices, and means to conduct a cooling medium to and from said cooling means, said conducting means being connected to the grounded ends of said devices.

2. Arrangement according to claim 1, said devices comprising at least three resistors and three reactance coils, said resistors and reactance coils forming a high pass filter for high voltage direct current, said three resistors being arranged in a row, said three reactance coils being arranged in another row, said cooling medium conducting means including means to supply the devices of each row with cooling oil in series connection, and an expansion vessel common to the whole filter.

3. Arrangement according to claim 1, said devices comprising at least one resistor and one reactance coil, the housing enclosing both said coils, the end of said reactance coil connected to the high voltage being lowermost.

4. Arrangement according to claim 3, said housing comprising two parts, one of said parts enclosing said resistor and the second part enclosing said reactance coil, said two parts being connected to each other.

5. Arrangement according to claim 4, said housing being made of insulating material.

6. Arrangement according to claim 4, the part of said housing enclosing said resistor being made of steel sheet material.

7. Arrangement according to claim 1, an expansion vessel, said fluid medium conducting means including conduits connecting said devices at their uppermost parts to said expansion vessel, said conduits containing gas operating relays.

References Cited by the Examiner

UNITED STATES PATENTS

| 1,989,782 | 2/1935 | Anderson | 317—103 |
| 2,039,028 | 4/1936 | Pierson | 317—103 |
| 2,501,345 | 3/1950 | MacNeill et al. | 317—103 |
| 2,917,685 | 12/1959 | Wiegand | 174—15 |

KATHLEEN H. CLAFFY, *Primary Examiner.*